United States Patent
Song

(10) Patent No.: US 9,832,975 B2
(45) Date of Patent: Dec. 5, 2017

(54) PREFABRICATED PLAYTHING FOR PET

(71) Applicant: Hak Soo Song, Seoul (KR)

(72) Inventor: Hak Soo Song, Seoul (KR)

(73) Assignee: Hak Soo Song, Seoul (KR)

( * ) Notice: Subject to any disclaimer, the term of this patent is extended or adjusted under 35 U.S.C. 154(b) by 0 days.

(21) Appl. No.: 15/322,337

(22) PCT Filed: Apr. 29, 2015

(86) PCT No.: PCT/KR2015/004293
§ 371 (c)(1),
(2) Date: Dec. 27, 2016

(87) PCT Pub. No.: WO2015/199330
PCT Pub. Date: Dec. 30, 2015

(65) Prior Publication Data
US 2017/0135318 A1     May 18, 2017

(30) Foreign Application Priority Data
Jun. 27, 2014 (KR) .................. 20-2014-0004865 U

(51) Int. Cl.
*A01K 15/02* (2006.01)
*A01K 1/035* (2006.01)

(52) U.S. Cl.
CPC ............ *A01K 15/024* (2013.01); *A01K 1/035* (2013.01)

(58) Field of Classification Search
CPC .... A01K 1/0353; A01K 15/024; A01K 15/02; A01K 15/027; A01K 1/033; A01K 13/004
(Continued)

(56) References Cited

U.S. PATENT DOCUMENTS 2,825,305 A * 3/1958 Tatge .................. A01K 13/004
                                                 119/660
3,479,990 A * 11/1969 Crow .................. A01K 15/024
                                                 108/151
(Continued)

FOREIGN PATENT DOCUMENTS

| JP | 2005110580 | 4/2005 |
|---|---|---|
| KR | 1020060087716 | 8/2007 |
| WO | WO 2013157810 | 10/2013 |

OTHER PUBLICATIONS

Opened Internet Shopping Homepage (http://www.nipandbones.com/sycamore-real-cat-tree.html, Nov. 27, 2011) See picture of p. 1.

*Primary Examiner* — Trinh Nguyen
(74) *Attorney, Agent, or Firm* — IP & T Group LLP

(57) ABSTRACT

The present invention relates to a prefabricated plaything for a pet. More specifically, the present invention provides an amenity that a pet can easily ascend and descend, including: an easily replaceable friction means and a shelter, wherein the pet relieves stress and trains its body while rubbing its body, claws, and teeth against the friction means or biting the same, and rests in the pouch of the shelter in which a darkroom comfortable for resting is maintained. A technical means for achieving this comprises: a base panel that has a column formed on the upper surface thereof, wherein the column has a fastening hole; an extension rod that has a fastening protrusion formed on the lower portion thereof, which is screw-coupled to the fastening hole of the column, and a coupling hole formed in the upper portion thereof; a friction rope positioned to surround the outer surface of the extension rod; and a stem part that has a coupling protrusion formed on the lower portion thereof, which is screw-coupled to the coupling hole of the extension rod, and is provided with leaves.

2 Claims, 6 Drawing Sheets

(58) Field of Classification Search
USPC ...... 119/28.5, 706, 702, 705, 485, 482, 652, 119/663
See application file for complete search history.

(56) References Cited

U.S. PATENT DOCUMENTS

| | | | | |
|---|---|---|---|---|
| 5,577,466 | A * | 11/1996 | Luxford | A01K 15/025 |
| | | | | 119/485 |
| 6,431,120 | B1 | 8/2002 | Feldman | |
| D668,002 | S * | 9/2012 | Mulligan | D11/118 |
| 8,695,533 | B1 * | 4/2014 | Mulligan | A01K 1/035 |
| | | | | 119/28.5 |
| 2002/0179021 | A1* | 12/2002 | DeRaspe-Bolles | A01K 15/025 |
| | | | | 119/706 |
| 2003/0192486 | A1* | 10/2003 | DeRaspe-Bolles | A01K 15/025 |
| | | | | 119/706 |
| 2008/0149042 | A1* | 6/2008 | Halpern | A01K 15/027 |
| | | | | 119/706 |
| 2008/0282987 | A1 | 11/2008 | Ritchey | |
| 2011/0155073 | A1* | 6/2011 | Kilroy | A01K 63/003 |
| | | | | 119/247 |
| 2014/0033987 | A1* | 2/2014 | Hoffman | A01K 15/02 |
| | | | | 119/706 |

* cited by examiner

Fig. 4
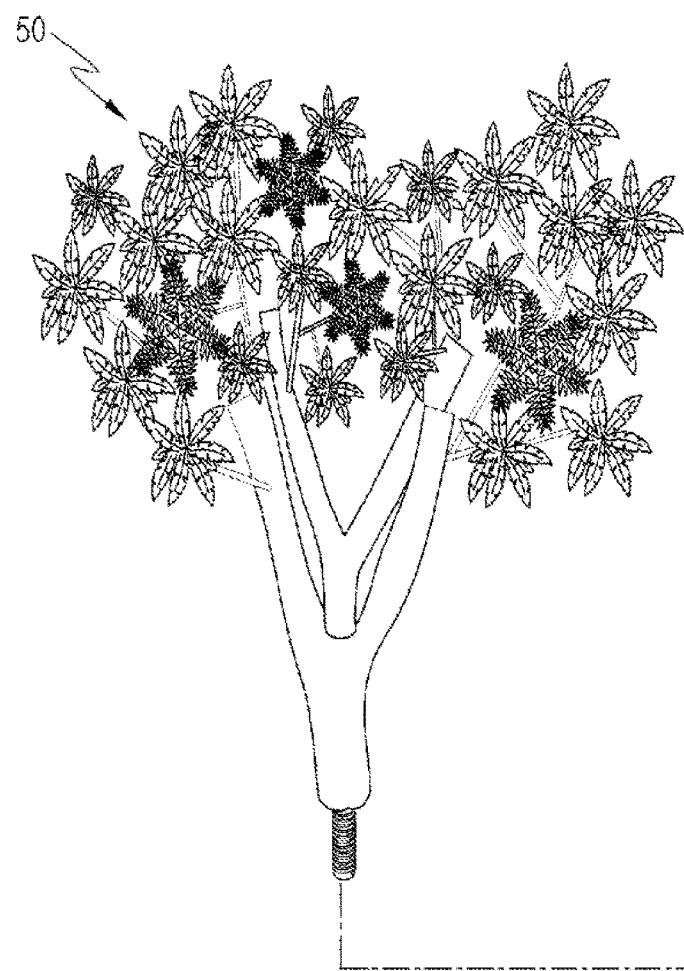
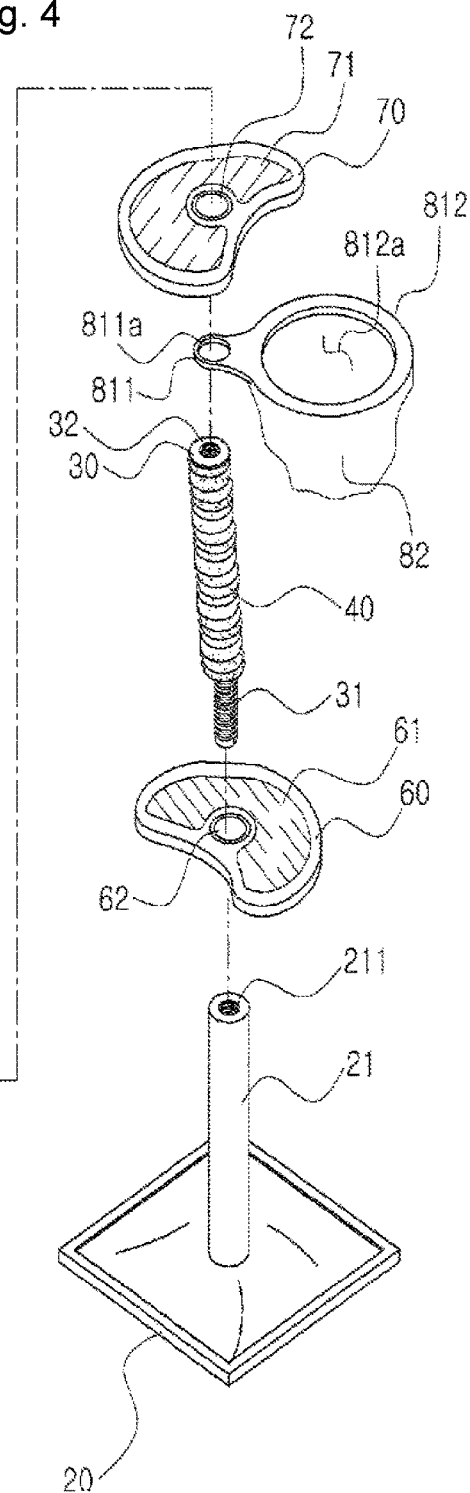

PREFABRICATED PLAYTHING FOR PET

This application is a national stage application of PCT/KR2015/004293 filed on Apr. 29, 2015, which claims priority of Korean patent application number 20-2014-0004865 filed on Jun. 27, 2014. The disclosure of each of the foregoing applications is incorporated herein by reference in its entirety.

TECHNICAL FIELD

The present invention relates to a prefabricated plaything for a pet. More specifically, the present invention relates to a prefabricated plaything for a pet, capable of providing an amenity including a rubbing unit, which is easily replaceable with new one and allows the pet to easily ride up and down while relieving stress or working out by rubbing or biting with a body, claws, or teeth of the pet, and a shelter part which is maintained in the form of a darkroom for comfortable rest so that the pet enters a pouch of the shelter part to rest therein.

BACKGROUND ART

Generally, pets are animals that have been mainly raised for enjoyment by humans. Humans have been breeding mammals, birds, and fishes as well as dogs, cats, canaries, and goldfish since ancient times. However, in recent years, reptiles and amphibians including snakes, lizards, crocodiles, turtles, frogs, and salamanders are raised as pets. In particular, bloodlines are important for dogs and cats, and goldfish is famous as a product of the improvement of species.

Recently, as interest in pets is increased, people having various pets, such as dogs and cats, are generally increased in the country.

However, most pets are predatory animals and have traits, such as sharp teeth and strong, sharp, and retractable claws, of the predatory animals. Accordingly, the pets frequently scratch something with the claws to grind the claws in order to relieve stress, thereby significantly causing damages to living tools such as sofas, furniture, and wallpaper in the house.

In order to solve the above problems, Korea Patent Application No. 10-2006-0087716 discloses an amenity capable of basically resolving the instinct of animals as pets having sharp claws to frequently scratch something or ride up are allowed to always freely scratch the amenity. In addition, the amenity serves as a playground and a resting place for climbing and playing at any time, so that animals can be improved in the intelligence and health thereof. The amenity may transmit garden feeling in a living space, so that the amenity may be utilized as an interior accessory or have an interior decoration function.

However, according to the amenity for the pet of the related art, a stem body is integrally formed with decoration leaves, so that the height of the stem body may not be adjusted. In particular, the pet, which has a sharp claw to habitually frequently scratch something or like riding, is supported on the outer surface of the stem body while moving. Accordingly, the outer surface of the stem body may be cracked to degrade beauty, which results from the absence of facilities for the rest of the pet on the stem body in addition to an animal resting plate in a panel structure.

For reference, the invention of the above-described cited reference refers to only the background technology of the art in which the present invention pertains, and does not refer to the prior art.

DISCLOSURE

Technical Problem

The present invention is developed to meet the needs of consumers having pets recently. An object of the present invention is to provide a prefabricated plaything for a pet, capable of providing an amenity which includes a rubbing unit, which is easily replaceable with new one to reduce maintenance costs and allows the pet to relieve stress or work out by rubbing or biting with a body, claws, or teeth of the pet while easily riding up and down along the amenity as a portion of claws of the pet is introduced into a portion of the rubbing unit in the process of riding up and down with sharp claws, and a shelter part provided to be maintained in the form of a darkroom so that the pet enters a pouch of the shelter part to rest therein.

Technical Solution

According to the present invention, there is provided a prefabricated plaything for a pet, which includes a base panel formed on a top surface thereof with a column having an engaging hole, an extension rod formed on a lower portion thereof with an engaging protrusion screwed to the engaging hole of the column and formed in an upper portion thereof with a coupling hole, a rubbing rope arranged while being wound around an outer surface of the extension rod, and a stem part formed at a lower portion thereof with a coupling protrusion, which is screwed to the coupling hole of the extension rod, and having a leaf.

The extension rod is further formed in the outer surface thereof with a spiral groove part, and the rubbing rope is arranged to be wound along the groove part to prevent the rubbing rope from sagging or loosening as the pet moves.

In addition, a lower support panel is further interposed between the column and the extension rod to support the pet such that the pet rests thereon, and an upper support panel is further interposed between the extension rod and the stem part.

A shelter part having a through hole and is further interposed between the column and the extension rod or between the extension rod and the stem part, and the shelter part includes a fixing panel, which includes a connection panel formed therein with the through hole and a ring part having an inlet port, and a pouch formed under the ring part such that the pet is placed in the pouch after introduced through the ring part.

In addition, a door having a rim fitted around an annular friction ring is further mounted on the ring part and pivoted to open or close the inlet port, such that an internal space of the pouch becomes a darkroom.

Advantageous Effects

As described above, according to the prefabricated plaything for the pet of the present invention, the rubbing rope is provided in which a portion of the claws of the pet is introduced when the pet rides up and down with the sharp claws, so that pets easily ride up and down on the amenity. In particular, the rubbing rope, which serves as the rubbing unit used for relieving stress and working out by rubbing or biting with the body, the claws, and the teeth of the pet while the pet easily rides up and down, can be easily replaced with new one. Accordingly, the maintenance costs can be remarkably reduced. The shelter part is provided to be maintained in the form of a darkroom, so that the pet enters the pouch of the shelter part to comfortably rest therein.

DESCRIPTION OF DRAWINGS

FIG. 4 is an exploded perspective view showing a prefabricated plaything for a pet according to a second embodiment of the present invention.

BEST MODE

Mode for Invention

Figure 1:
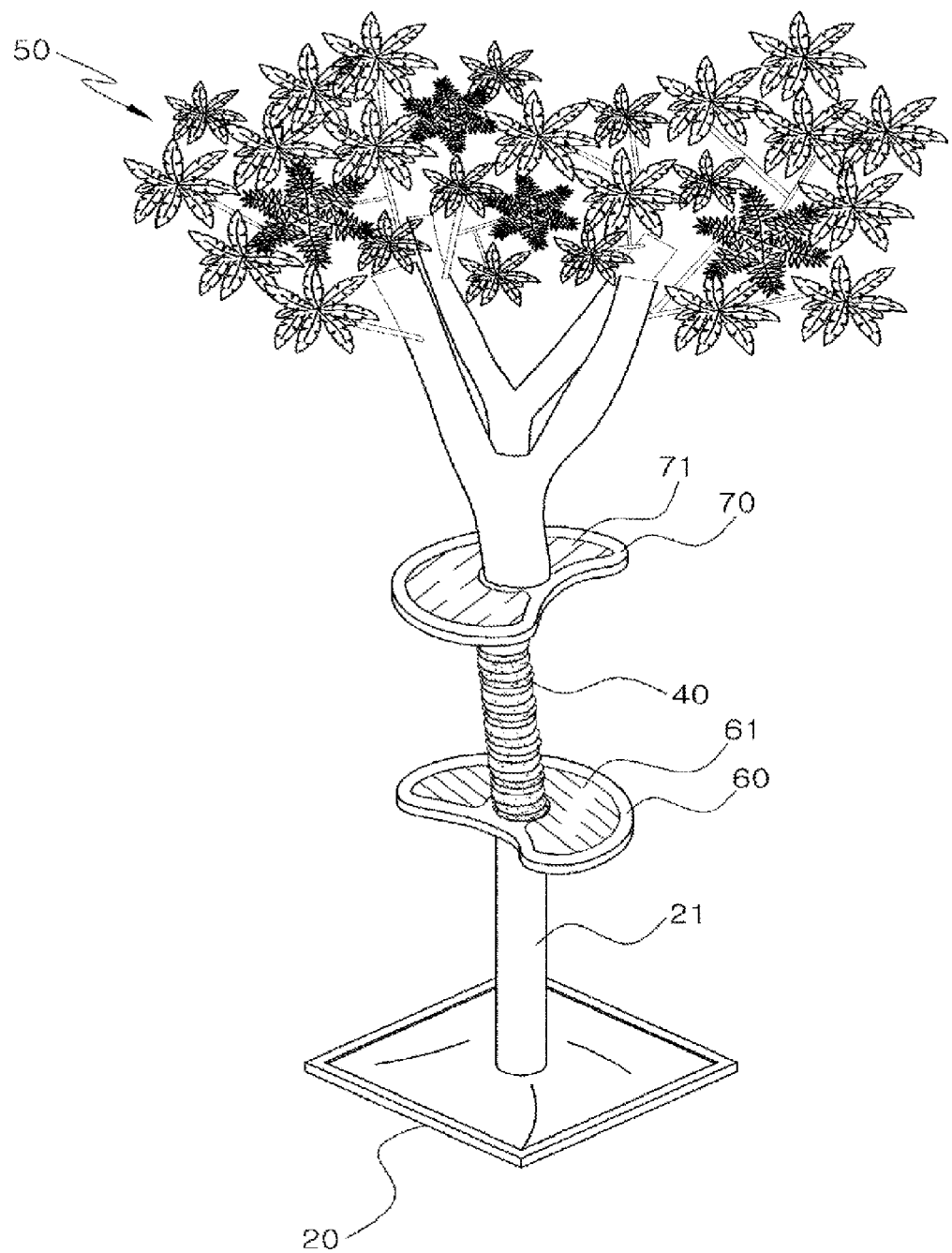
FIG. 1 is an assembling perspective view showing a prefabricated plaything for a pet according to a first embodiment of the present invention.

Hereinafter, a prefabricated plaything for a pet according to the present invention will be described with reference to accompanying drawings. The thicknesses of lines or the size of components shown in the drawings may be exaggerated for the purpose of explanation and clarity. The following terminology is defined based on functions of components according to the present invention, and may have meanings varying according to the intentions of a user or an operator and the custom in the field of art. Accordingly, the terminology should be defined based on the whole context throughout the present specification.

In addition, the following embodiments does not limit the scope of the present invention, but provided for the illustrative purpose. It should be understood that all modification, equivalents, or alternatives of these embodiments are included within the scope of the present inventive concept.

Figure 2:
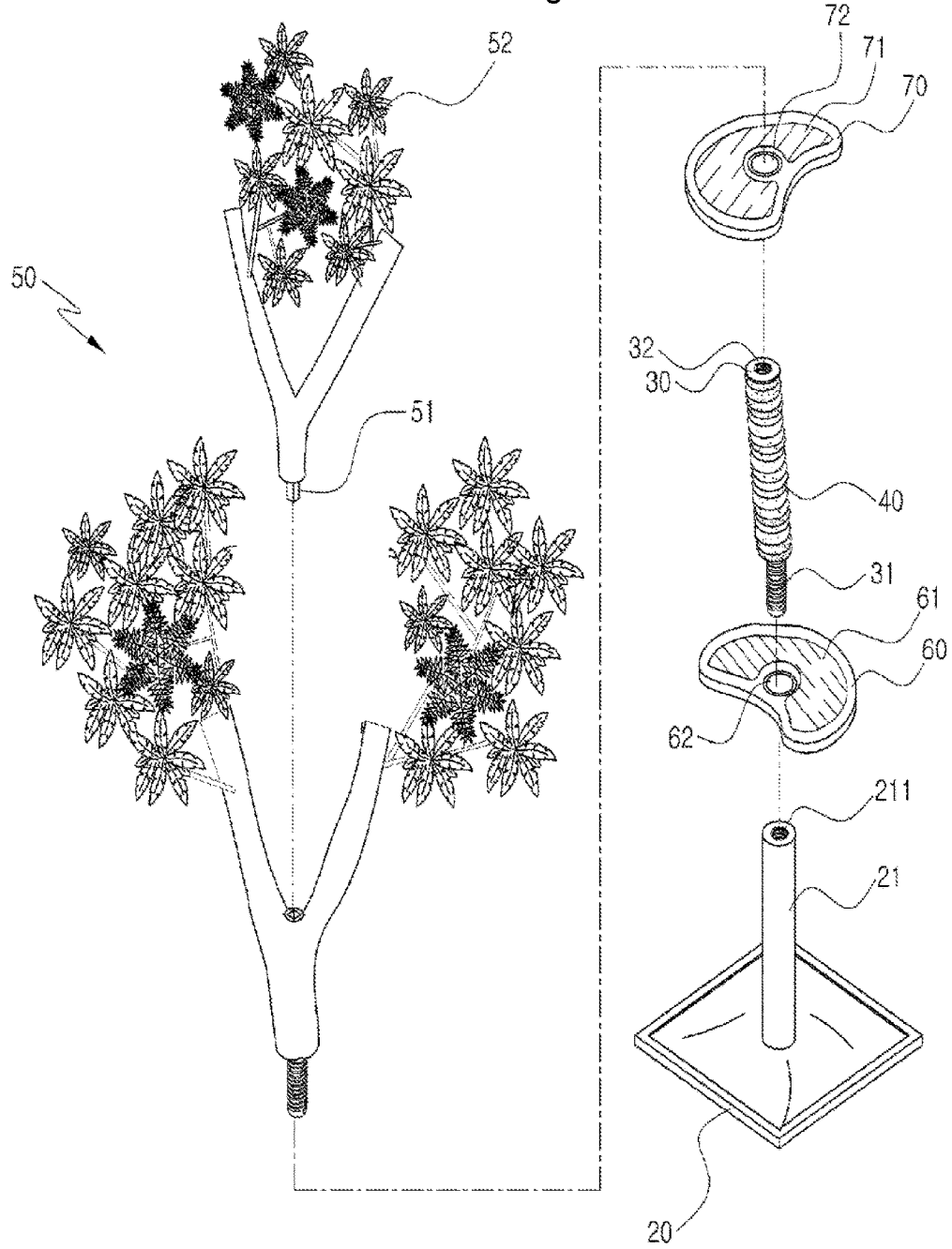
FIG. 2 is an exploded perspective view showing the prefabricated plaything for the pet according to the first embodiment of the present invention.
Figure 3:
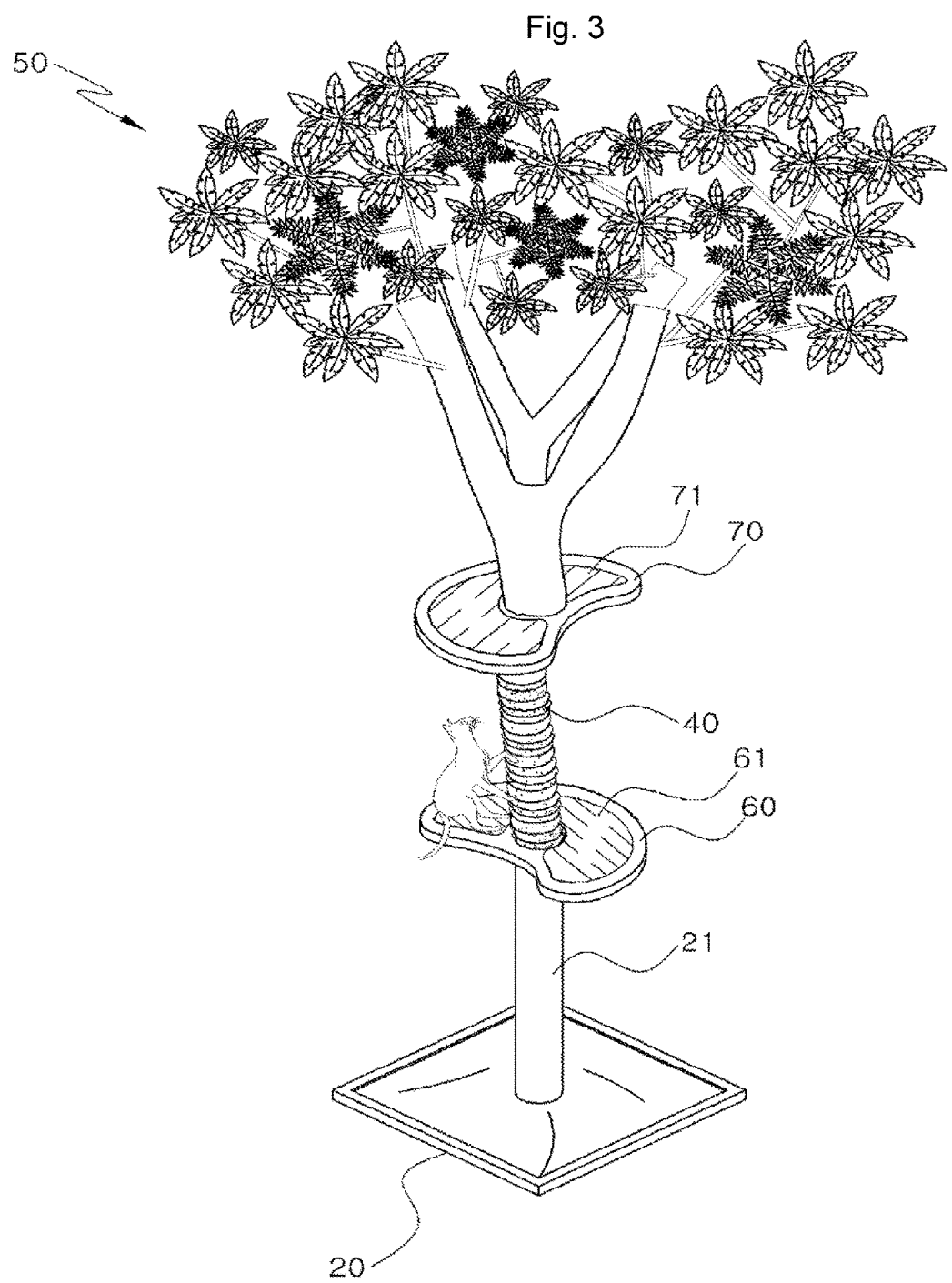
FIG. 3 is a perspective view showing the use state of the prefabricated plaything for the pet according to the first embodiment of the present invention.
Figure 5:
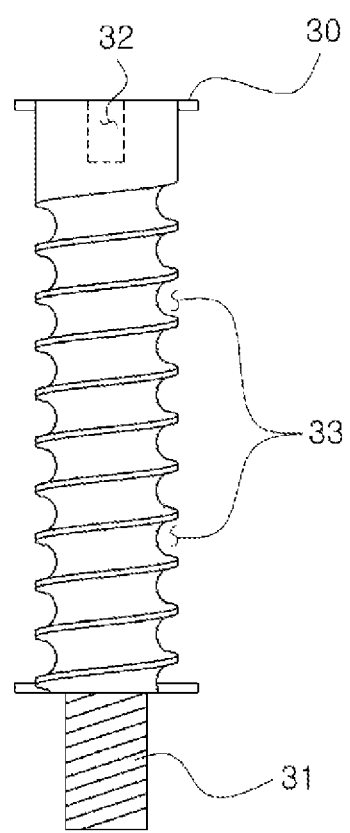
FIG. 5 is a view showing the structure of an extension rod applied to a prefabricated plaything for a pet according to a third embodiment of the present invention and having a rubbing rope wound therearound.
Figure 6:
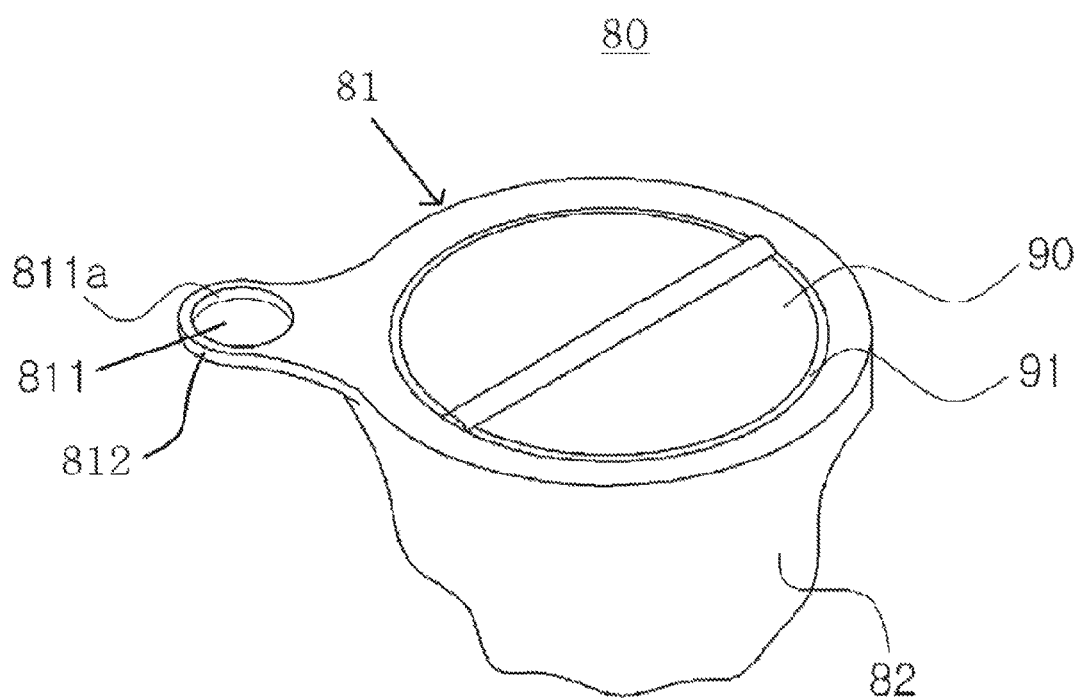
FIG. 6 is a perspective view showing a shelter applied to a prefabricated plaything for a pet according to a fourth embodiment of the present invention and allowing a cat to rest therein.

FIG. 1 is an assembling perspective view showing a prefabricated plaything for a pet according to a first embodiment of the present invention. FIG. 2 is an exploded perspective view showing the prefabricated plaything for the pet according to the first embodiment of the present invention. FIG. 3 is a perspective view showing the use state of the prefabricated plaything for the pet according to the first embodiment of the present invention. FIG. 4 is an exploded perspective view showing a prefabricated plaything for a pet according to a second embodiment of the present invention. FIG. 5 is a view showing the structure of an extension rod among components of a prefabricated plaything for a pet according to a third embodiment of the present invention. FIG. 6 is a view showing an example of a shelter among components of a prefabricated plaything for a pet according to a fourth embodiment of the present invention.

As shown in drawings, the prefabricated plaything for the pet (referred to as "plaything" for the convenience of explanation) according to the present invention is to allow the pet to easily ride up and down, to hang thereon while playing, or to rest therein. Accordingly, the plaything 10 includes a base panel 20, which is grounded on the floor, an extension rod 30, which couples other components provided above the base panel 20 to each other, a rubbing rope 40 serving as a rubbing unit, which allows the pet, especially, a cat having sharp claws to relieve stress by rubbing or biting the rubbing unit with claws, or teeth of the pet, and a plurality of stem parts 50.

First, the base panel 20 is formed of a synthetic resin material or a metallic material, and formed integrally with a column 21 protruding upward from the center of a top surface thereof. The column 21 is formed in an upper inner circumferential surface thereof with a thread.

In addition, the base panel 20 is preferably basically formed in a rectangular panel shape, which represents a stable form, as shown in FIG. 1. The base panel 20 may be formed in various shapes such as a circular shape and a polygonal shape in addition to the rectangular shape, or provided in the form of multiple bars.

In addition, the extension rod 30 is formed of a synthetic resin or a metallic material, formed at a lower portion thereof with an engaging protrusion 31 protruding from a bottom surface thereof to be screwed to an engaging hole 211 of the column 21, and formed in an upper portion thereof with a coupling hole 32 having a thread formed at an inner circumferential surface thereof, so that mutually screw-coupling is basically performed. However, if necessary, the extension rod 30 may have a detachably coupling structure so that the extension rod 30 is pressed and simply fitted to be jointed.

In addition, the extension rod 30 is basically formed in a smoothly rounded rod shape as shown in FIG. 1, and may be formed in a rectangular shape or a polygonal shape if necessary.

In addition, the rubbing rope 40, which serves as a rubbing unit, allows the pet to relieve stress by biting, scratching, or rubbing, and is arranged to be wound around an outer surface of the extension rod 30. The rubbing rope 40 is basically used to relieve stress or work out by rubbing, or biting with the body, the claws, or the teeth thereof. If necessary, when the pet relieves stress or rides up, the rubbing rope 40 allows a claw end of the pet to be introduced into the rubbing rope 40 so that the pet may easily ride up.

In addition, as shown in FIG. 2, the rubbing rope 40 is wound around the outer surface of the extension rod 30 having a groove part 33, which is obliquely formed, in a spiral direction and fixedly bonded to the extension rod 30. Alternatively, after the rubbing rope 40 is wounded round the extension rod, an end portion of the rubbing rope is tied to a wound end portion of the extension rod 30. Accordingly, the rubbing rope 40 is prevented from being excessively exposed to the outer surface of the extension rod 30 and concavely wounded along the groove part 33 of the extension rod 30 so that the rubbing rope 40 is maintained in a stably coupling state. Accordingly, the coupling of the rubbing rope 40 may be prevented from loosening due to the contact with the cat, so that the fixing state of the rubbing rope 40 may be ensured.

In addition, the rubbing rope 40 is mainly formed by twisting rice straw in the form of a rope. Alternatively, the rubbing rope 40 may include a rope formed of a fiber material or a synthetic fiber material having relatively high durability and being clean.

In addition, the stem part 50 is a component that may provide visual beauty for the pet and a user. The stem part 50 is formed at a lower portion thereof with a coupling protrusion 51, which is screwed to the coupling hole 32 of the extension rod 30, and formed at an upper portion thereof with leaves 52. Preferably, the stem part 50 is basically formed of a synthetic resin material.

Hereinafter, an installation process that the prefabricated plaything for the pet, which has the above configuration, according to the present invention is assembled will be described. In the state that the base panel 20 is placed at an installation place, the extension rod 30 is screwed to the column of the base panel 20 and then the stem part 50 is screwed to the extension rod 30. Thereafter, after winding the rubbing rope 40 around the outer surface of the extension rod 30, the rubbing rope 40 is fixed to the extension rod 30, thereby finishing a series of processes.

Referring to FIG. 4, the groove part 33, which is spirally shaped, is further formed in the outer surface of the extension rod 30, and the rubbing rope 40 is arranged to be wound along the groove part 33, so that the rubbing rope 40 is prevented from sagging or loosening as the pet moves. In addition, since the rubbing rope 40 is wound along the groove part 33, the rubbing rope 40 may be easily mounted. In this case, the upper and lower ends of the rubbing rope 40 wound along the groove part 33 are preferably surrounded by a rubber band to be bound and fixed to the groove part 33.

Referring to FIG. 5, a lower support panel 60 is further interposed between the column 21 and the extension rod 30 to support the pet so that the pet may rest thereon. In addition, an upper support panel 70 is further interposed between the extension rod 30 and the stem part 50.

In other words, the lower support panel 60 is formed of a synthetic resin, and a frictional sheet 61 formed of a fiber material or a synthetic fiber material is further attached to a top surface of the lower support panel 60 to prevent the pet from sliding when the pet rides up and comfortably rests thereon. The lower support panel 60 is formed therein with a fitting hole 62 to be fitted around the engaging protrusion 31 so that the engaging protrusion 31 is coupled to the engaging hole 211 through the fitting hole 62. In addition, the lower support panel 60 is pressed and fixed between the base panel 20 and the extension rod 30.

In addition, as shown in FIG. 2, the upper support panel 70 is pressed and fixed between the extension rod 30 and the stem part 50 as the coupling protrusion 51 is coupled to the coupling hole 32 after the coupling protrusion 51 of the stem part 50 to be described below is fitted into a fitting hole 72, and a friction sheet 71 is attached to the top surface of the upper support panel 70 to prevent sliding.

Referring to FIG. 6, a shelter part 80 having a through hole 811*a* is further interposed between the column 21 and the extension rod 30 or between the extension rod 30 and the stem part 50. The shelter part 80 includes a fixing panel 81, which includes a connection panel 811 formed therein with the through hole 811*a* and a ring part 812 formed integrally with the connection panel 811 and having an inlet port 812*a*, and a pouch 82 formed of a fiber material, and formed under the ring part 812 so that the pet is placed in the pouch 82 after introduced through the ring part 812.

In this case, preferably, a door 90 having a rim fitted around an annular friction ring 91 is further mounted on the ring part 812 to be pivoted so that the door opens or closes the inlet port 812*a*, so the internal space of the pouch 82 becomes a darkroom.

In other words, a pet, especially a cat, likes a cozy and restful darkroom. To this end, the pouch 82 is fused or bonded to the fixing panel 81 having the through hole 811*a* and the inlet port 812*a*, and the through hole 811*a* is fitted around the coupling protrusion 51 of the stem part 50 so that the shelter part 80 is interposed between the stem part 50 and the extension rod 30, or fitted around the engaging protrusion 31 of the extension rod 30 so that the shelter part 80 is interposed between the column 21 and the extension rod 30.

In addition, the door 90 is provided on the inlet port 812*a* to darken the internal space, and the friction ring 91 produces friction with the inner circumferential surface of the inlet port 812*a* so that the door 90 is pivoted as the pet applies force to the door 90, and prevents light from being introduced into a gap between the inlet port 812*a* and the door 90.

DESCRIPTION OF REFERENCE NUMERALS

10: Plaything
20: Base Panel
30: Extension Rod
40: Rubbing Rope
50: Stem Part
60: Lower Support Panel
70: Upper Support Panel
80: Shelter Part
90: Door
21: Column
211: Engaging Hole
31: Engaging Protrusion
32: Coupling Hole
33: Groove Part
51: Coupling Protrusion
52: Leaf
61: Friction Sheet
62: Fitting Hole
71: Friction Sheet
72: Fitting Hole
81: Fixing Panel
811: Connection Panel
811*a*: Through Hole
812: Ring Part
812*a*: Inlet Port
82: Pouch
91: Friction Ring

What is claimed is:

1. A prefabricated plaything for a pet, comprising:
a base panel formed on a top surface thereof with a column having an engaging hole;
an extension rod formed on a lower portion thereof with an engaging protrusion screwed to the engaging hole of the column and formed in an upper portion thereof with a coupling hole;
a rubbing rope arranged while being wound around an outer surface of the extension rod; and
a stem part formed at a lower portion thereof with a coupling protrusion, which is screwed to the coupling hole of the extension rod, and having a leaf,
wherein the extension rod is further formed in the outer surface thereof with a spiral groove part, and the rubbing rope is arranged to be wound along the groove part to prevent the rubbing rope from sagging or loosening as the pet moves,
wherein a shelter part having a through hole is further interposed between the column and the extension rod or between the extension rod and the stem part, and
wherein the shelter part includes a fixing panel, which includes a connection panel formed therein with the through hole and a ring part having an inlet port, and a pouch formed under the ring part such that the pet is placed in the pouch after introduced through the ring part, wherein a door having a rim fitted around an annular friction ring is further mounted on the ring part and pivoted to open or close the inlet port, such that an internal space of the pouch becomes a darkroom.

2. The prefabricated plaything of claim 1, wherein a lower support panel is further interposed between the column and the extension rod to support the pet such that the pet rests thereon, and an upper support panel is further interposed between the extension rod and the stem part.

\* \* \* \* \*